S. F. ZENGER.
SPRING WHEEL.
APPLICATION FILED APR. 18, 1912.
1,049,635.
Patented Jan. 7, 1913.
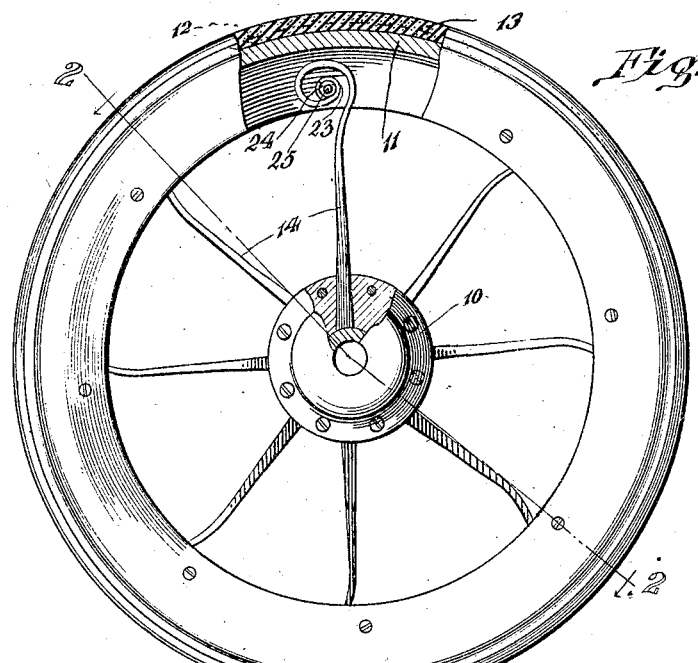
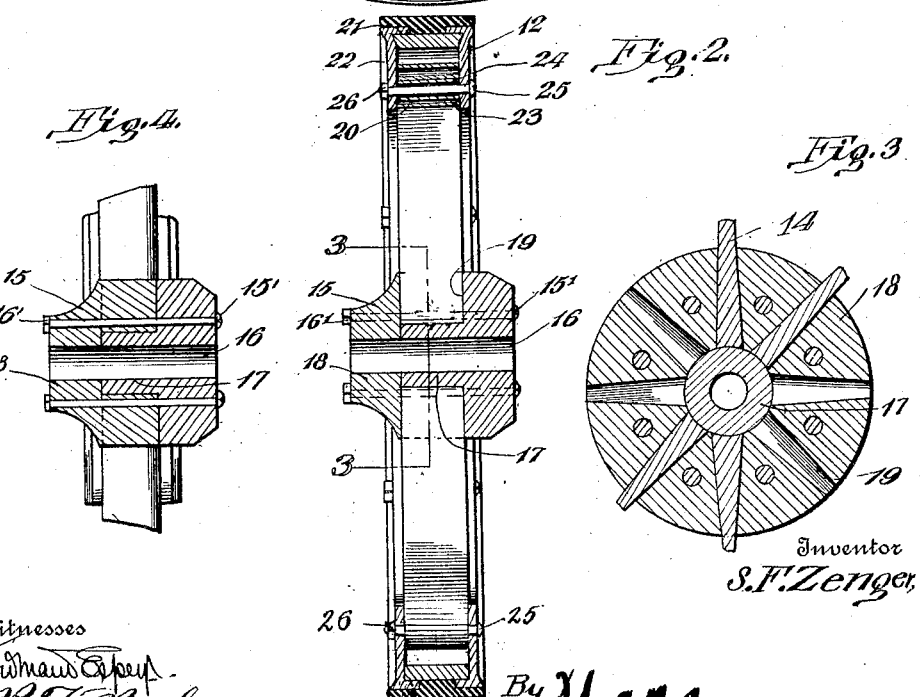
Witnesses
Inventor
S. F. Zenger,
By Attorney

UNITED STATES PATENT OFFICE.

SIMON F. ZENGER, OF COVINGTON, PENNSYLVANIA.

SPRING-WHEEL.

1,049,635.  Specification of Letters Patent.  Patented Jan. 7, 1913.

Application filed April 18, 1912. Serial No. 691,585.

*To all whom it may concern:*

Be it known that I, SIMON F. ZENGER, a citizen of the United States, residing at Covington, in the county of Tioga and State of Pennsylvania, have invented certain new and useful Improvements in Spring-Wheels, of which the following is a specification.

My invention relates to improvements in wheel constructions and more particularly to that type of wheel employing resilient spokes, and the object of my invention is to provide a resilient wheel, particularly adapted to motor vehicles, in which sufficient resiliency will be obtained by the specific construction of the resilient spokes to permit of the doing away of the pneumatic tire now generally in use.

A further object of my invention is to construct a spring wheel comprising a hub, a felly, a detachable rim carried by the felly, and resilient spokes connecting the hub and rim.

A further object of my invention is to provide a spring wheel including a hub, a felly, a detachable rim, a tire, and a plurality of resilient spokes connecting the hub and rim and secured to the rim in such a manner that the spoke securing means also serves to secure the rim to the felly and the tire to the rim. And a still further object of my invention is to improve the construction and increase the efficiency of wheels of the above described character.

With these and other objects in view, my invention will be more clearly described, illustrated in the accompanying drawings, and then specifically pointed out in the claims which are attached to and form a part of this application.

In the drawings; Figure 1 is a side elevation of the preferred embodiment of my wheel, parts being shown in section to better show the details of construction; Fig. 2 is a section on the line 2—2 of Fig. 1. Fig. 3 is a transverse section of the hub; Fig. 4 is a longitudinal section of the hub.

Corresponding and like parts are referred to in the following description and indicated in all the views of the accompanying drawings by the same reference characters.

The preferred embodiment of my wheel comprises in general, a hub 10, felly 11, detachable rim 12, tire 13, and a plurality of resilient spokes 14 secured by their inner ends to the hub and by their outer ends to the detachable rim, the bolts securing the spokes to the rim also serving to lock the rim to the felly and the tire to the rim, as will be hereinafter more fully explained.

Referring more specifically to the construction of the hub, it will be seen to consist of two parts, a hub member proper 15 provided with the customary longitudinally extending, spindle receiving bore 16, the inner end of which is counterbored to form a cylindrical socket for the reception of a centrally formed, cylindrical extension 17 of the face plate 18, which face plate forms the other member of the hub and which is also provided with a spindle receiving bore in alinement with that of the hub member proper. These two hub members are detachably secured together by a plurality of bolts 15' which are passed through alined bores formed in the hub members and which are held in place by nuts 16'.

The inner face of the hub member proper 15 is provided with a plurality of radially directed, spaced apart slots 19 adapted to receive the inner ends of the resilient spokes 20, the spokes being held against lateral movement by the face plate 18 and against inward movement by the cylindrical member 17 of the face plate, against the outer face of which they bear.

The felly consists of an annular ring which may be formed of wood or metal and in one or more pieces as preferred, and carried by this felly is the detachable rim 12. This rim consists of two members, each comprising an annular ring 21 adapted to engage closely about the peripheral face of the felly, one upon each side thereof and each provided upon its outer edge with an integrally formed, inwardly directed flange 22, these members being so proportioned that when in place upon the felly, the edge portions of the parts 21 are spaced from each other, as shown in Fig. 2.

The spokes 20 are formed of resilient material, preferably steel and are uniform in width throughout their length, but taper gradually in thickness from their inner to their outer ends, this tapering in thickness not only serving to increase the resiliency of the outer portion of the spokes, but also acting to lock the inner ends of the spokes against outward movement from the hub. The free ends of these spokes are bent into spiral configuration and terminate each in an eye 23 adapted to receive a bushing 24 forming bearings for the bolts 25 which are passed through suitable perforations formed in the flanges 22 of the detachable rim members and through the bushings and which are secured in place by nuts 26, the pivotal connection thus provided, giving perfect freedom to the spokes.

As best shown in Fig. 2 of the drawings, the spokes are slightly narrower than the felly, while the bushings are equal in length to the width of the felly and it will therefore be seen that when the nuts 26 are turned home upon the bolts 25, the rim members will be firmly secured upon the felly, the bushings acting as spacer members between the flanges of the rim.

The tire, previously designated by the numeral 13, is preferably made of solid rubber, although other materials may be employed if desired and is provided upon its inner face with an integrally formed, inwardly directed annular shoulder 27 which, under normal conditions, is somewhat greater in width than the space between the portions 21 of the rim members when the latter are secured in place.

In applying the tire, the nuts 26 are loosened to permit the spreading of the rim members, the tire is positioned about the rim with its shoulder 27 between the opposing portions 21 of the rim members and the nuts are again tightened to clamp the rim members in place, this clamping action serving to compress the shoulder 27 of the tire between the portions 21 of the rim members and thus lock the tire against lateral movement upon the rim.

From the foregoing description, it will be apparent that I have provided a spring wheel of extreme simplicity in construction, the detachable rim members and tire being secured in place by the clamping of the bolts which secure the free ends of the spokes to the rim. It will further be apparent that I have so secured the inner ends of the resilient spokes in the hub as to absolutely hold them against all movement, while at the same time they may be readily removed in case of breaking.

The entire wheel, with the exception of the tire, will be preferably formed of metal and will therefore be strong and durable.

Having thus described the invention, what is claimed as new is:

1. A wheel construction, including a felly, a detachable rim member surrounding said felly upon one side and having an inwardly directed annular flange, a second detachable rim member surrounding the felly upon the other side and having an inwardly directed annular flange, the opposed edge portions of said rim members being spaced apart, a tire having an inwardly directed annular shoulder formed upon its inner face and mounted upon said rim members with its shoulder positioned between the opposing edge portions of the rim members, a plurality of bolts passed through the flanges of the rim members and locking the rim members upon the felly and compressing the shoulder of the tire between the rim members, a hub, and a plurality of resilient spokes secured by their inner ends in the hub and pivotally secured by their outer ends on said bolts.

2. A resilient wheel comprising a hub, a felly, a rim, spokes supported by the hub, spoke supports carried by the felly, the body portion of the spokes tapering in thickness to a point adjacent the felly, the spokes at this point being disposed obliquely with respect to their body portions, the remaining portion of the spoke being of substantially the same thickness throughout, said portion being coiled in a direction opposite to that at which it is bent adjacent the body portion and embracing the spoke support, its terminal being secured to said support.

In testimony whereof I affix my signature in presence of two witnesses.

SIMON F. ZENGER. [L. S.]

Witnesses:
WM. S. BLAIR,
G. A. SPRING.